No. 673,220. Patented Apr. 30, 1901.
J. A. PERKINS.
ROLLER BEARING.
(Application filed Sept. 7, 1900.)
(No Model.) 2 Sheets—Sheet 1.
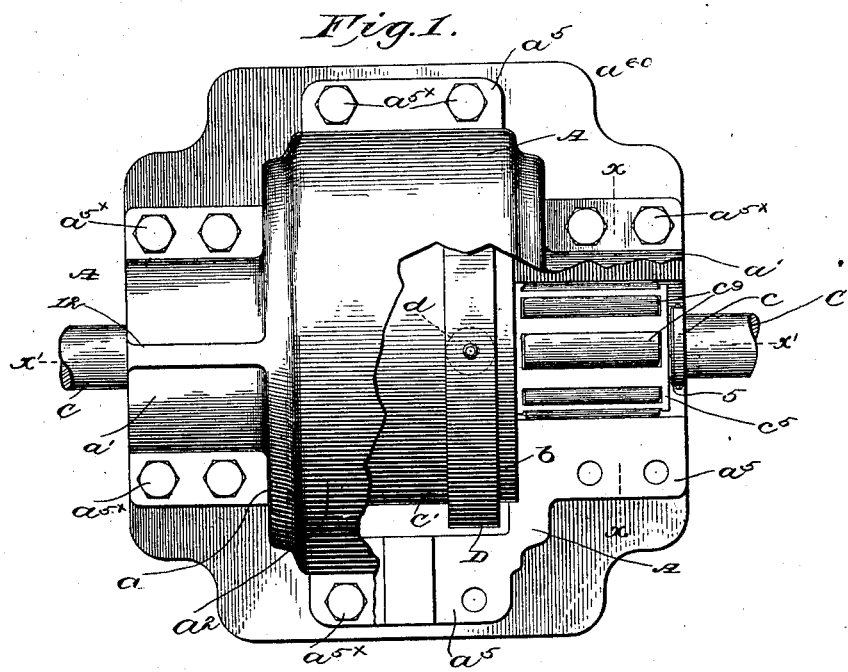
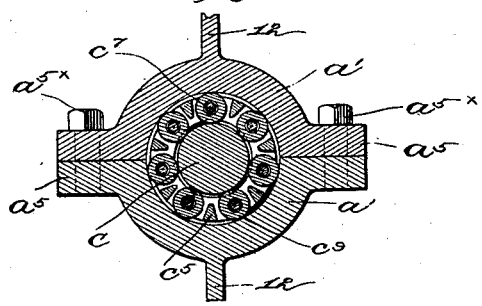
Witnesses. Inventor.
Julius A. Perkins,
By Crosby Gregory.
attys.

No. 673,220. Patented Apr. 30, 1901.
J. A. PERKINS.
ROLLER BEARING.
(Application filed Sept. 7, 1900.)
(No Model.) 2 Sheets—Sheet 2.
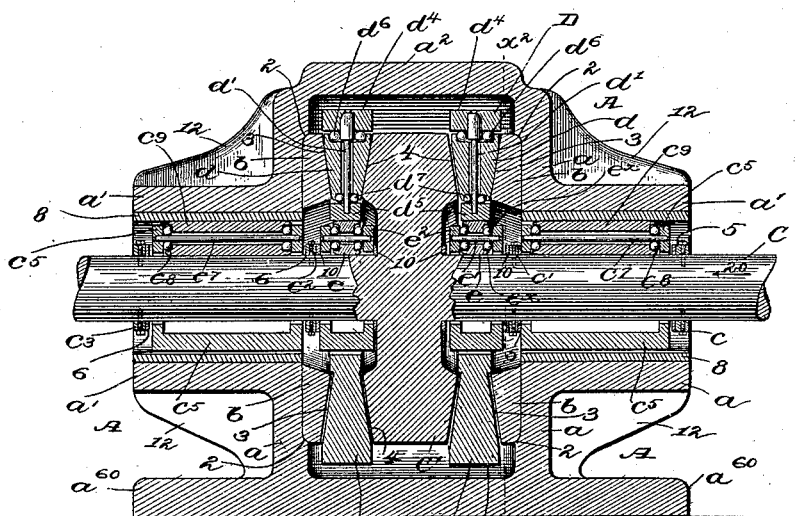
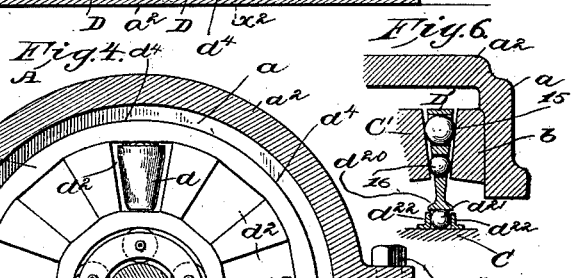
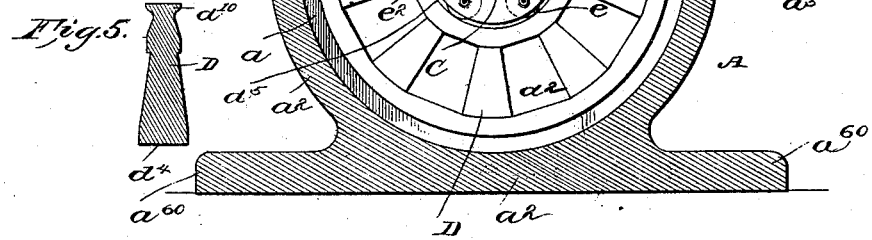
Witnesses.
Inventor.
Julius A. Perkins,
by Darby Gregory.
Atty's.

UNITED STATES PATENT OFFICE.

JULIUS A. PERKINS, OF OMAHA, NEBRASKA.

ROLLER-BEARING.

SPECIFICATION forming part of Letters Patent No. 673,220, dated April 30, 1901.

Application filed September 7, 1900. Serial No. 29,268. (No model.)

*To all whom it may concern:*

Be it known that I, JULIUS A. PERKINS, a citizen of the United States, residing at Omaha, county of Douglas, State of Nebraska, have invented an Improvement in Roller-Bearings for Shafts Subjected to End Thrusts, of which the following description, in connection with the accompanying drawings, is a specification, like characters on the drawings representing like parts.

Many shafts in use are subjected to very considerable end thrust, this being especially the case in shafts employed to actuate propellers of vessels, and it may be supposed that the shaft herein to be described actuates a propeller.

The shaft has a fixed collar provided at its opposite sides with inclined faces, and opposed to said faces are stationary tracks which are fixed relatively to the shaft, said tracks being fixed in a rigid casing surrounding and substantially completely inclosing the collar and the track, said casing having an elongated hub at each end which surrounds the shaft. Between the track-faces of the collar and the tracks I interpose a series of conical rollers mounted in traveling washer-shaped rigid cages sustaining a series of non-rotating axial supports which radiate from the center of the cage, said cage having coöperating with it a set of cylindrical bearing-rollers, they acting to sustain either the inner or the outer edge of said cage, said bearing-rollers being alined one with relation to the other by suitable non-rotating spindles carried in rigid cages, the chambered ends of the conical bearing-rollers and of the cylindrical bearing-rollers each receiving suitable balls, said balls being interposed between the chambered ends of the rollers and the cages and between the said rollers and the spindles carried by the cages in order that said rollers may rotate about said spindles without contact therewith.

The shaft referred to has fixed to and movable with it a plurality of pairs of cage-controllers, they coöperating with the ends of two rigid traveling cages containing spindles for alining the bearing-rollers, said rollers having interposed between them and said spindles and the inner sides of the cages balls to prevent the contact of the rollers with either the cage or the spindles, and I have interposed between the ends of these two cages inserted in the space between the rotating shaft and the interior of the hub of the casing and as faces for said traveling cage-controllers suitable antifriction-washers, so that said cages in their longitudinal movement on or with relation to the shaft and in the hub of the casing may meet said antifriction-washers, or it might be the faces of the traveling-cage controllers, and be struck by said more rapidly rotating surfaces or washers and be moved and properly centered to run substantially freely between the said washers or the faces of said cage-controllers.

Figure 1 in top or plan view shows a suitable casing and a shaft contained therein, said casing being partially broken out to represent the bearing-rollers in the hub of the casing, said figure also showing the exterior of one of the cages containing the conical bearing-rollers, the collar, and a track. Fig. 2 is a cross-section in the line $x$, Fig. 1. Fig. 3 is a longitudinal section of Fig. 1 in the line $x'$. Fig. 4 is a section on the irregular dotted line $x^2$, Fig. 3. Fig. 5 illustrates in section a traveling cage modified in shape, and Fig. 6 shows a modified form of traveling cage and antifriction device interposed between the inner face of the traveling cage and the shaft.

Referring to the drawings, A represents a suitable casing composed of side walls $a$, having connected extended hubs $a'$, the opposite walls $a$ being united by a rigid wall $a^2$, formed, as shown, by casting, thus forming a stiff rigid casing. The casing may be further stiffened by ribs 12 between the side walls and the hubs. This casing will preferably be divided longitudinally into a plurality of parts, so that the casing may be applied to the shaft which may be in place, and to enable the parts of the casing to be united together I have shown each part as having suitable ears or flanges $a^5$ to be united rigidly by suitable set-screws $a^{5\times}$ or by any other suitable means. The drawings show the casing as having a base or foot $a^{60}$; but in practice the base or foot may be varied as desired or omitted. The hubs $a'$ may have applied within them suitable linings 8. The inner faces of the side walls $a$ of this rigid casing sustain suitable tracks $b$, represented as fixed in position therein by the outer circular edges of the tracks meeting a suitable shoulder 2, represented as circular and formed at the inner faces of the side walls, said tracks having, as shown, inclined faces 3.

The shaft C may be supposed to be a propeller-shaft; but I have not herein deemed it necessary to represent the propeller connected with the shaft, and instead of the shaft carrying a propeller to actuate a vessel it might do any other work the tendency of which was to exert end thrust on the shaft.

The shaft C is provided with a collar C', preferably forged integral therewith, so as to possess great strength and obviate any possibility of motion of the collar on or with relation to the shaft, said collar being provided, as shown, at its outer sides near its periphery with opposed inclined faces 4, said inclined faces 3 and 4 being shown of such taper that if prolonged they would intersect the longitudinal center of said shaft.

The shaft C is shown as provided with four cage-controllers $c$ $c'$ $c^2$ $c^3$, each fixed thereto and traveling with the shaft, the surfaces $c$ and $c'$, constituting one pair, being represented as provided at their opposed faces with antifriction-washers 5, preferably composed of vulcanite, the opposed faces of the second pair, $c^2$ $c^3$, being represented as faced by antifriction-washers 6, also composed, preferably, of vulcanite. The faces of these pairs of cage-controllers are separated one from the other, as shown viewing $c$ $c'$, for a distance greater than the length of each rigid traveling roller-carrying cage $c^5$, interposed between said controllers, the alined roller-bearings of said cages being interposed between the surface of the rotating shaft and the interior of the hub of the stationary casing. Each rigid cage $c^5$, one in each hub $a'$ and between each pair of cage-controllers, has a series of alined holes, in which are fixed against axial rotation suitable supports, as $c^7$, of any desired number, which act to center and aline a series of bearing-rollers, as $c^9$, said rollers having their ends chambered to receive balls $c^8$, said balls entering said chambers and being interposed between the ends of the bearing-rollers and the side walls of the cage and also being interposed between the said rollers and the said support. In ordinary conditions of the shaft the rigid cages containing the bearing-rollers $c^9$ run freely in the direction of rotation of the shaft C, but at a slower speed and without contact of the end walls of the cage with said washers; but in case for any reason said bearing-rollers get at all out of horizontal position or out of proper alinement with relation to the center of rotation of the shaft C said cages will slide somewhat and temporarily meet the washers carried by the cage-controllers, and the cages will be struck a blow, which will instantly return them into their central free-running position. The interposition of these long bearing-rollers $c^9$ between the extended hubs of the casing A and the shaft C constitutes a means which absolutely prevents any trembling motion or vibration of the shaft, due to strain thereon in its rapid rotation, from being transferred to the tracks or faces between which move the traveling cages D, having the conical bearing-rollers $d$, now to be described. Each cage D is represented as a plate or casting having a series of spaces $d^2$ and circular faces $d^4$ and $d^5$ of any desired number, said spaces receiving the conical bearing-rollers, they being centered and alined in said spaces by antifriction means, shown as non-rotative spindles $d'$ and balls $d^6$ $d^7$.

The bearing-rollers $d$ are shown as chambered at their ends to receive balls, shown of different diameters, the balls $d^6$ in the chambers at the outer ends of said rollers being larger in diameter than the balls $d^7$ at the inner ends thereof, each set of balls of differing diameter in said chambers serving to prevent the contact of the ends of said rollers with the walls of said cage and also serving to prevent the contact of said rollers with the spindles.

The spindles $d'$ are represented as of two diameters, the smaller diameter entering pits in the cage D, while the enlarged ends of the spindles are fixed each in a hole exposed at the face $d^4$ of said cage, the outer end of each spindle being retained in fixed position by upsetting or turning inwardly to overlap the end of the spindle, shaped other than round, a part of the metal of the cage, such upsetting fixing the spindle in and preventing its rotation in the cage.

To prevent lateral movement of the cage D, I have combined with it antifriction means, represented in Fig. 3 as bearing-rollers $e$, contacting with the face $d^5$ of said cage, said rollers being chambered at their ends and surrounding supports $e'$, fixed in alined holes made in a rigid traveling cage $e^2$, said cylindrical bearing-rollers being chambered and receiving antifriction means, shown as a series of balls $e^\times$, which are interposed between the ends of said rollers and the inner sides of the cage and also between the said rollers and said spindles, thus preventing the contact of said rollers at their ends with either the cage or spindles.

I have surrounded the shaft C, at each side of the end walls of the cage $e^2$, with antifriction-washers 10, the washers at the outer sides of said cages being backed up by the cage-controllers $c'$ and $c^2$, while the washers at the inner sides of the cages are backed up by the collar C', and in practice each cage containing the bearing-rollers $e$, which act as antifriction means between the cages D and the rotating shaft C, runs freely in the space between the faces of the antifriction-washers 10 without touching; but under certain conditions in use of the bearing these cages may slide and meet one or the other of the faster-moving washers, and the blow caused by said faster-moving surface against the slower-moving cage will act to instantly return the said cage into its free-running position, and for the best and most durable construction the faces of these surfaces $c'$, $c^2$, and 10 must be clothed with antifriction-washers, preferably of vulcanite or other well-known equivalent material, which constitutes a natural lubricant and against which a metal part may strike without wear.

The conical bearing-rollers present, except at their ends, true tapered surfaces, and the inclined faces of the collar and the faces of the tracks with which the surfaces of the conical rollers coact are also shown as presenting true tapers throughout the part which is acted upon by the tapering surface of each roller, and while it may be best that the taper of the rollers and the taper of the tracks and faces correspond substantially, yet this invention is not limited to making the roller and the tracks and faces of exactly the same taper; but the taper may vary according to the particular conditions required in the bearing.

It is absolutely essential for the best results in a bearing of the class herein sought to be patented, it showing a double-faced collar, that the case supporting the tracks between which the collar revolves should be absolutely rigid and solid, and a case composed of rings united simply by tie-bolts would in my judgment be wholly inoperative, and, further, the conical rollers should not contact at any point with said cage or the means for supporting and alining said rollers—such, for instance, as spindles—for rubbing friction of said rollers with such parts would constitute an absolutely inoperative construction, and consequently I shall always sustain said rollers by antifriction means, so that under no conditions can the said rollers in their rotation be restrained due to the rubbing of metal against metal.

As a modification of my invention (see Fig. 5) I may increase the width of the end-thrust cage D until its inner wall $d^{10}$ nearly meets the surface of the shaft C, at which point I may interpose between said inner wall and the surface of the shaft bearing-rollers such as shown in Fig. 3.

As a further modification I may change the shape of the end-thrust cage (see Fig. 6) where said cage is marked D', and instead of employing spindles and conical rollers alined thereby, as in Fig. 3, I may provide the cage with a plurality of ball-receiving spaces to receive balls 15 16, varying in diameter and contacting at diametrically opposite points with an inclined face of the collar and an inclined face of a track, and by the term "washer-shaped cage containing antifriction means" I mean to include not only the conical bearing-rollers represented in Fig. 3, but also the balls represented in Fig. 6.

The cage, modified in shape and represented in Fig. 6, may, and preferably will, be composed of antifriction material—such, for instance, as vulcanite—and it may have a foot $d^{20}$ to run on antifriction means, shown as balls $d^{21}$, held between walls $d^{22}$, applied to the shaft C, partially represented in Fig. 6. In the use of this bearing the antifriction means of one or the other of the end-thrust bearings when the shaft is hard pressed will rotate at times and at other times will remain at rest—as, for instance, when the shaft is subject to end-thrust strain which will tend to crowd it in the direction of the arrow 20, Fig. 3, the conical rollers located at the left-hand side of said collar will alone resist the end thrust of the shaft to the left and will be rotated, and at such time the rollers in the end-thrust cage at the right, they not being subjected to pressure, will remain practically at rest, and in such condition the rollers at the left, Fig. 3, may be relieved from contact with the track-face of the collar C'.

It will be understood that the ends of the bearing-rollers $c^9$ and of the conical rollers $d$ are each reduced, to thereby prevent pounding of the flanged ends of the rollers between the balls in the chambers at the ends of said rollers and the outside surfaces forming a portion of the bearing. The conical rollers interposed between the collar on the shaft and the track surrounding the shaft roll over the collar and track, each presenting a surface contacting with said rollers, and while for the best results I prefer that the face of the collar and of the track may be of the same inclination, yet this is immaterial so long as said faces contact with the peripheries of said rollers in their planetary motion. In some instances I may use a collar having but one face to sustain the conical rollers acted upon diametrically by the track used.

Having described my invention, what I claim as new, and desire to secure by Letters Patent, is—

1. A shaft having a collar and at each side thereof cage-controllers, tracks surrounding said shaft at opposite sides of said collar, a casing inclosing said tracks and collar rigidly and provided with chambers at its ends, traveling endwise-moving roller-bearing cages located in said chambers and coöperating with said controllers and serving as bearings for the shaft outside said track, and suitable antifriction means interposed between the faces of the collar and the tracks.

2. A shaft having a collar movable therewith, cage-controllers carried by said shaft at each side said collar, a rigid casing inclosing said collar and tracks, the end walls of the casing having connected chambered hubs, tracks located in said casing at opposite sides of said collar and surrounding said shaft, rigid traveling cages interposed between the faces of the collar and the tracks, conical rollers contained in said cages and contacting with the opposite sides of said collar, and with a face of each of said tracks, antifriction means sustaining said conical rollers in said cages, and suitable antifriction roller-bearings located in said hubs and surrounding said shaft.

3. A rotatable shaft having a fixed collar, a surrounding rigid casing, tracks sustained by said casing at each side said collar, a plurality of end-thrust cages having spaces, a series of conical rollers, and antifriction means sustaining both ends of said conical rollers in said cages.

4. In a roller-bearing of the class described, a rotating shaft provided with a fixed collar, a rigid casing sustaining a plurality of tracks and presenting extended hubs, traveling cages inserted between said collar and tracks and containing conical rollers, and spindles to aline them, antifriction means interposed between said conical rollers and their alining means, to prevent contact of said rollers with said alining means or with said cage, traveling cages having alined roller-bearings interposed between the shaft and the interior of each hub, and traveling-cage controllers fixed to the shaft and located thereon at a distance apart sufficient to enable the cages in said hub to travel between said supports without rubbing friction.

5. In a roller-bearing of the class described, a rotating shaft provided with a fixed collar presenting inclined faces, a rigid casing sustaining a plurality of tracks and presenting extended hubs, traveling cages inserted in said hubs and having spindles to aline a series of bearing-rollers, antifriction means interposed between said bearing-rollers and the cages containing them, and between said rollers and the spindles alining them; traveling-cage controllers fixed to the shaft and located thereon at a sufficient distance apart to enable the cages to travel between said supports without rubbing friction, rigid end-thrust cages having a series of conical bearing-rollers interposed between said collar and tracks, and antifriction means interposed between the opposite ends of said conical bearing-rollers and said cages to prevent contact of said rollers with said cages.

6. In a roller-bearing of the class described, a rotating shaft provided with a collar movable therewith and presenting inclined faces; a rigid casing sustaining a plurality of tracks and presenting extended hubs; traveling cages inserted in said hubs and having spindles to aline a series of bearing-rollers, antifriction means interposed between said bearing-rollers and the cages containing them and the spindles alining them; traveling-cage controllers fixed to the shaft and located thereon at a distance apart sufficient to enable the cages to travel in said hubs between said controllers without rubbing friction, rigid end-thrust cages interposed between said collar and tracks and having radial spindles, a series of conical bearing-rollers alined by said spindles, antifriction means interposed between said spindles and the flanges of said conical rollers to prevent contact of said rollers with said spindles and said cages; rigid cages containing a series of cylindrical bearing-rollers to coöperate with said end-thrust cages, and antifriction means to sustain said cylindrical bearing-rollers in said rigid cages.

7. In a bearing of the class described, a shaft having a collar, a casing provided with an antifriction roller-bearing for said shaft at one side said collar, a circular track opposed to the side face of said collar, a rigid traveling cage interposed between said collar and track and carrying a series of conical bearing-rollers, and antifriction means sustaining both ends of said rollers in said cage.

8. A shaft having a collar, a casing provided with an antifriction roller-bearing for said shaft at one side said collar, a circular track opposed to the side face of said collar, a rigid traveling cage interposed between said collar and track, roller-supports carried by said cage, a series of conical bearing-rollers surrounding said supports, and antifriction means interposed between the opposite ends of said conical bearing-rollers and said supports.

9. In a bearing of the class described, a shaft having a fixed collar provided with an inclined face, and a rigid casing presenting a track provided with an inclined face, combined with a traveling end-thrust cage having spindles, a series of conical bearing-rollers surrounding said spindles and chambered at their ends, and balls in said chambers and interposed between the inner walls of the cage and the spindles, the balls in the chamber at the base end of the conical rollers being of larger diameter than at the smaller end thereof.

10. In a bearing of the class described, a shaft having a fixed collar provided with an inclined face, a rigid casing presenting a track provided with an inclined face; a traveling end-thrust cage having spindles, a series of conical bearing-rollers surrounding said spindles and chambered at their ends, balls in said chambers and interposed between the cage and the spindles, the balls in the chamber at the base end of the conical rollers being of a larger diameter than at the smaller end thereof; combined with antifriction means coöperating with one circular wall of the end-thrust cage containing the conical bearing-rollers.

11. In a bearing of the class described, a shaft having a fixed collar provided with an inclined face, a rigid casing presenting a track provided with an inclined face; a traveling end-thrust cage having spindles, a series of conical bearing-rollers surrounding said spindles and chambered at their ends, balls in said chambers and interposed between the inner walls of the cage and the spindles, the balls in the chamber at the base end of the conical rollers being of larger diameter than at the smaller end thereof; combined with antifriction means coöperating with the inner circular wall of the end-thrust cage containing the conical bearing-rollers.

12. In a roller-bearing, a revoluble shaft having a collar provided with two inclined faces, two opposed tracks having inclined faces, traveling circular rigid end-thrust cages of decreasing thickness from their outer toward their inner edges and having spaces for the reception of suitable rollers contacting oppositely with the faces of said collar and the faces of said tracks, cage-controllers traveling with said shaft, rigid cages surrounding said shaft and occupying a position between said cage-controllers, said cages containing a series of rollers which coact with the inner walls of said end-thrust cages, said rollers being alined by spindles and having antifriction means interposed between said rollers and said spindles.

13. In a bearing of the class described, a shaft having a fixed collar provided with inclined faces, a rigid casing presenting tracks provided with inclined faces, a plurality of traveling rigid end-thrust cages, narrower at their inner than at their outer faces, a series of antifriction devices carried by said end-thrust cages, a series of antifriction devices interposed between the inner circular edges of said cages and the shaft, the inner edges of said cages by contact with said antifriction means being centered properly about said shaft to thereby maintain said end-thrust cage properly centered with relation to the shaft.

In testimony whereof I have signed my name to this specification in the presence of two subscribing witnesses.

JULIUS A. PERKINS.

Witnesses:
ROBT. P. HAINS,
GEO. W. GREGORY.